United States Patent

[11] 3,561,717

| [72] | Inventors | Thomas M. Frederick<br>Palos Verdes;<br>Leslie W. Baxter, Palmdale, Calif. |
|---|---|---|
| [21] | Appl. No. | 820,954 |
| [22] | Filed | May 1, 1969 |
| [45] | Patented | Feb. 9, 1971 |
| [73] | Assignee | Northrop Corporation<br>Beverly Hills, Calif.<br>a corporation of California |

[54] CONNECT-DISCONNECT FIXTURE
6 Claims, 1 Drawing Fig.

[52] U.S. Cl. .................................................. 248/317,
118/500; 248/72, 248/228; 294/85
[51] Int. Cl. ........................................................ B66d 3/00
[50] Field of Search .......................................... 248/317,
323, 327, 72, 17, 58, 59, 62, 228, 229; 118/500,
501, 502, 423, 426, 630, 635; 294/116, 85;
24/241, 241SL

[56] References Cited
UNITED STATES PATENTS

| 1,160,194 | 11/1915 | Painter ........................ | 248/72 |
| 1,686,174 | 10/1928 | Rauschenberger ........... | (118/502UX) |
| 2,422,865 | 6/1947 | Tucker ........................ | (294/85UX) |
| 3,084,893 | 4/1963 | Ruth ............................ | 248/228 |
| 3,376,156 | 4/1968 | Whitaker et al. ............. | 118/635X |

*Primary Examiner*—Roy D. Frazier
*Assistant Examiner*—J. Franklin Foss
*Attorneys*—Harold L. Fox and Willard M. Graham ABSTRACT: A transportation and hanger assembly including means enabling the assembly to be releasably secured to overhead structure while retaining relative large components thereon in a releasable, suspended and locked relation and incorporating means precluding the possibility of electrolytic action between components carried by the fixture and overhead structure to which the fixture is attached.

PATENTED FEB 9 1971　　　　　　　　　　　　　　　3,561,717
Fig.1　　　　Fig.2　　　　　　　　Fig.5
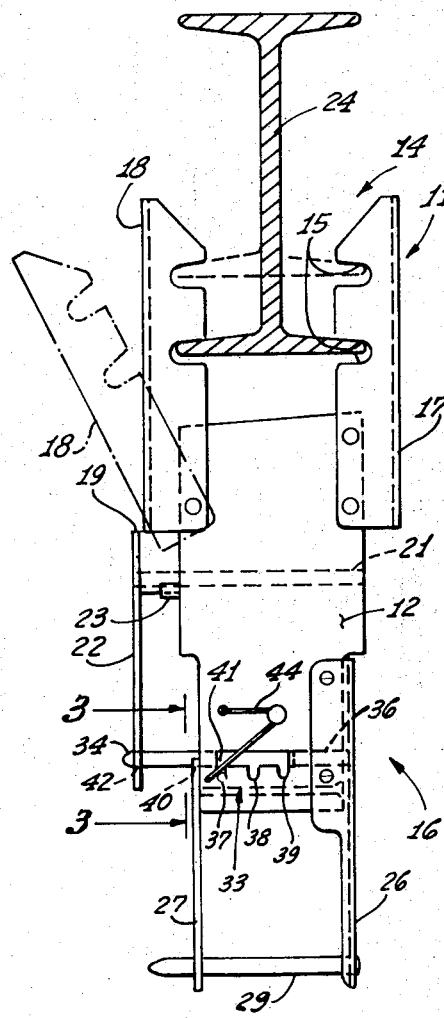
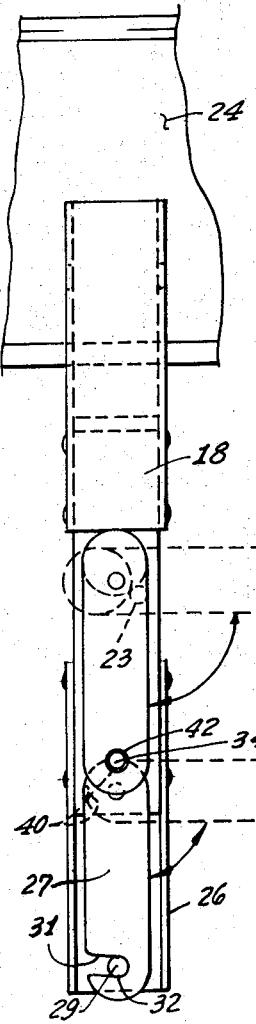
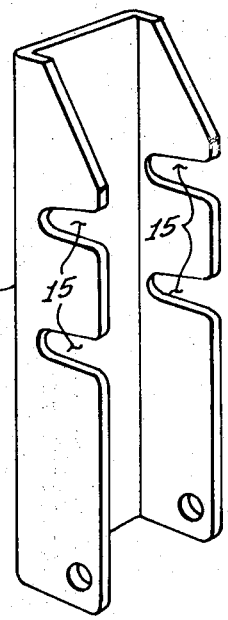
Fig.3　　　Fig.4
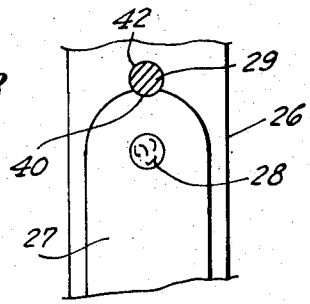
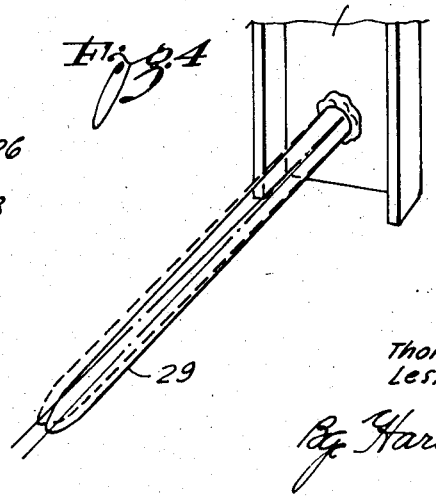
INVENTORS:
Thomas M. Frederick
Leslie W. Baxter
By Harold L. Fox
AGENT 3,561,717

CONNECT-DISCONNECT FIXTURE

The present invention pertains generally to fixturelike assemblies and more particularly to transportation and hanger assemblies adapted to be releasably secured to overhead structure, for example—the lower flange of an I-beam or the like—and incorporates means enabling a loaded assembly to be transferred from one overhead structure to another.

Frequently it becomes expeditious to transfer handling assemblies from fixed structure to transportation vehicles and vice versa without removing components therefrom, The foregoing is particularly true in the aircraft industry especially in situations in which large skins or panels are carried by the subject assemblies.

Briefly, the present invention pertains to transportation and handling assemblies including upper and lower securing means, the upper means being utilized to releasably secure the assembly of overhead structure, for example—to the lower flange of an I-beam or the like—and the lower means to releasably secure components therein carried in a suspended relation. The fixture also incorporates means precluding electrolytic action between the aforementioned components and the fixture, also between the components and the overhead structure, particularly at such time as the components are immersed in a liquid.

An object of the present invention is to disclose a transportation and hanger assembly in which the assembly may be releasably secured to overhead structure while functioning to maintain components carried thereby in locked relation.

Another object is to disclose a transportation and handling assembly in which the assembly, also components carried thereby, may be moved or transferred from one overhead structure to another.

Another object is to disclose a transportation and handling assembly including means effectively preventing electrolytic action between components carried by the fixture and overhead structure to which the fixture is secured.

Another object is to disclose a transportation and handling assembly which is sad safe, economical to manufacture and free of malfunctioning tendencies. Although the characteristics features of the present invention are particularly pointed out in the appended claims, the invention itself, also the manner in which it may be carried out, will be better understood by referring to the following description taken in connection with the accompanying drawings forming a part of this application and in which:

FIGS. 1 and 2 are front and side elevational views, respectively, of the transportation and handling assembly disclosed herein;

FIG. 3 is a fragmentary view of FIG. 1 viewed on the line 3—3 of the latter figure;

FIG. 4 is a perspective view of the pin means associated with the lower means for holding components carried by the assembly;

FIG. 5 is a perspective view of the pivotally mounted means utilized in securing the assembly to overhead structure.

Referring to the drawings, a preferred embodiment of the transportation and handling assembly 11 as disclosed herein is shown in FIGS. 1 and 2. Major components of the assembly 11 include a body portion 12 and upper and lower subassemblies 14 and 16, respectively.

The body portion 12 substantially of rectangular configuration, constitutes a phenolic material, for example, laminated cloth micarta or similar dielectric material, insuring electrical insulation between the subassemblies 14 and 16 and between components carried by the assembly 11 and overhead structure.

The subassembly 14 includes a pair of channel members 17 and 18. The respective widths of the members 17 and 18 are substantially equal to the thickness of the body portion 12, thus as assembled the members 17 and 18 span the portion 12 substantially as shown in FIGS. 1 and 2. The member 17 is fixedly secured to an edge of the portion 12 while the member 18 is pivotally secured to the opposite edge of the portion 12.

Portions of the upper ends of the members 17 and 18 have cutaway portions as indicated by the numeral 15. Thus in the assembled positions of the members 17 and 18 on the body portion 12 the members and 17 and 18 embrace the lower flange of an I-beam 24 or the like at such time as the member 18 is urged to its upright position as indicated by solid construction in FIG. 1. The manner in which the member 18 is urged to its upright position will be further described as the disclosure progresses. The positions of the member 18 shown by solid and dotted construction in FIG. 1 are referred to as the upright and inclined position, respectively, of the member 18. The position in which the members 17 and 18 embrace the I-beam 24 is referred to as the closed position of the subassembly 14 and the position in which assembly 11 may be removed from the I-beam is referred to as the open position thereof.

A cam member 19 is mounted adjacent the lower edge of the member 18, bearing means for the cam member is provided by a pin member 21 extending through the body portion 12. A handle 22 is provided for actuating the cam member 19, the cam member provides maximum and minimum eccentricity at such times as the handle is in the position indicated by solid and dotted construction, respectively, in FIG. 2. A pin member 23 is mounted in the portion 12 functioning to arrest rotational movement of the cam member 19 as the latter reaches positions providing maximum and near minimum eccentricity.

Thus it will be seen at such times the handle member 22 is positioned, indicated by solid construction in FIG. 2, the member 18 will be urged to its upright position and the subassembly 14 will be in its closed position in which the lower flange of the I-beam 24 is received and firmly secured between them the members 17 and 18. The subassembly 14 is hereafter referred to as the first or primary securing means.

The lower subassembly 16, hereafter referred to as the secondary or second securing means and includes a pair of members 26 and 27. The member 26 constitutes –in part –a channel member somewhat similar to the member 17 and has a fixed relation with respect to the body portion 12. The member 27 constitutes a straplike member the upper end of which is pivotally attached to the portion 12 substantially as shown in FIGS. 1 and 2. The member 26 carries a pin member 29 at its lower end biased slightly in a downward direction with respect to the bite portion of the member 1 26 as shown in FIG. 4.

The member 27 has a slot 31 formed therein adjacent its lower end terminating in an indentation 32 of circular configuration. The pin member 29 is received in the slot 31 at such times as the member 27 is rotated to its locked position (solid construction in FIG. 2). The pin member 29, biased in the manner as discussed above, springs into the indentation 32 and is held in this position until manually moved therefrom. The position in which the pin member 29 is received in the slot 31 and indentation 32, as shown by solid construction in FIG. 2, is referred to as the locked position of the subassembly 16, the unlocked position of the subassembly 16 is shown by dotted construction in FIG. 2.

Means is also provided in the body portion 12 insuring that the first securing means 14 will be maintained in its closed position and the second securing means 16 in its locked position. The above means, indicated by the numeral 33, includes a pin member 34 a manually movable in a bore 36 extending transversly of the body portion 12. The pin member 34 is fabricated of teflon or similar material and functions in a manner presently discussed. The pin member 34 carries an auxiliary pin or locating member 41 serving to locate the pin member 34 in indentations indicated by the numerals 37, 38 and 39.

With the first and second securing means 14 and 16 in their closed and locked positions, respectively, it will be apparent that the pin member 34 passes through an aperture 42 provided in the handle 22 and seats itself in an indentation 40 provided in the member 27. Thus it will be seen the subassemblies 14 and 16 will be retained in their closed and locked positions, respectively, at this time as the auxiliary pin member 41 is positioned in the outboard indentation 37.

With the pin member 34 in its inboard position, corresponding to the position in which the auxiliary pin member 41 is in the indentation 39, the pin member 34 will be removed from the aperture 42 and the indentation 40 and the first and second securing means 14 and 16 are free to be moved to their open and unlocked positions, respectively. In this position components may be removed from the second securing means 16 and the assembly 11 removed from the I-beam 24.

With the pin member 34 in its intermediate position, corresponding to the position in which the pin member 41 is located in the indentation 38, the pin member 34 is withdrawn from the aperture 42 but remains in the indentation 40. Thus it will be apparent the cam member 19 may be actuated releasing the first securing means while retaining the second securing means 16 in its locked position.

In view of the fact that the pin member 34 is fabricated from a dielectric material any path for the flow of electric current between components carried by the assembly 11 and the I-beam 24 is completely blocked, the possibility of electrolytic action occurring between components carried by the assembly 11 and overhead structure is precluded.

Means 33 includes spring means 44 insuring that the auxiliary pin member 41 will be retained in either of the indentations 37, 38 or 39 until manually moved therefrom to another position.

Thus it will be seen that a transportation and handling assembly functioning to effect the various objects of the invention as set forth above is disclosed.

I claim:

1. A transportation and handling assembly adapted to be releasably secured to the lower flange of an I-beam or the like and retain components thereon in a locked relation, comprising;
   a. an elongated body portion constructed of phenolic material;
   b. first securing means mounted on the upper portion of said body portion;
   c. a first portion of said first securing means adapted to be actuated between an incline and upright position resulting in said first securing means assuming an open and a closed position in which the assembly is free to be removed from the I-beam and rigidly secured thereto, respectively;
   d. second securing means mounted on the lower portion of said body portion adapted to be actuated between locked and unlocked positions in which components carried by said second securing means are locked thereon and released therefrom, respectively; and
   e. and pin means mounted in said body portion having extended, intermediate and retracted positions and functions to preclude movement of said first securing means from said closed position and said second securing means from said locked position at such times as pin means is in said extended position.

2. Apparatus as set forth in claim 1, in which said first and second securing means may be moved to said open and unlocked positions, respectively, at such times as said pin means is in said retracted positions.

3. Apparatus as set forth in claim 2, in which said pin means is fabricated of a dielectric material.

4. Apparatus as set forth in claim 3, including cam means having maximum and minimum eccentricity acting to urge said first portion to said upright position at such times as cam means having maximum eccentricity contacts said first portion.

5. Apparatus as set forth in claim 4:
   a. including a handle member secured to said cam means whereby the latter may be actuated so that the maximum eccentricity is effective to contact said first portion of said first securing means;
   b. said pin means passing through an aperture in said handle member at such times as said first means is in said closed position thereby precluding movement of said first means.

6. Apparatus as set forth in claim 5, in which said pin means when in said extended position also passes through an indentation provided in said second securing means thereby precluding movement of the latter from said locked position.